United States Patent [19]

Earp

[11] Patent Number: 5,025,423
[45] Date of Patent: Jun. 18, 1991

[54] ENHANCED BOTTOM SONAR SYSTEM
[75] Inventor: Ronald L. Earp, Burlington, N.C.
[73] Assignee: AT&T Bell Laboratories, Murray Hill, N.J.
[21] Appl. No.: 454,081
[22] Filed: Dec. 21, 1989
[51] Int. Cl.$^5$ .............................................. G01S 15/00
[52] U.S. Cl. ................................... 367/137; 367/135; 367/87
[58] Field of Search ................... 367/87, 93, 135, 100, 367/101, 137; 209/590

[56] References Cited
U.S. PATENT DOCUMENTS
4,870,623 9/1989 Buckley et al. ......................... 367/7

Primary Examiner—Daniel T. Pihulic
Attorney, Agent, or Firm—C. E. Graves

[57] ABSTRACT

Buried ocean cable is irradiated with a suitable sonar signal, and in response emits distinct characteristic "signature" backscatter signals. The "signature" signals are distinct for specific individual constructions of cable, and therefore assist in determining the identity of a buried object without having to dig it up. Search apparatus launches the unique sonar signal toward the buried cable, with a predetermined beamwidth, attack angle, cross-section, and signal character. The signal consists of a succession of bursts of different frequencies, separated by a step function, for example, and separated by silent periods. The signal is repeated as the search vehicle travels a predetermined direction with respect to the estimated cable orientation. The backscatter signals are received by the sonar apparatus for analysis by digital comparison to a data library of known signal patterns, or for display on an operator's monitor.

26 Claims, 7 Drawing Sheets

TRANSMITTER FAN-BEAM
(SIDE-VIEW)

TRANSMITTER FAN-BEAM
(FRONT VIEW)

TRANSMITTER FAN-BEAM
(TOP-VIEW)

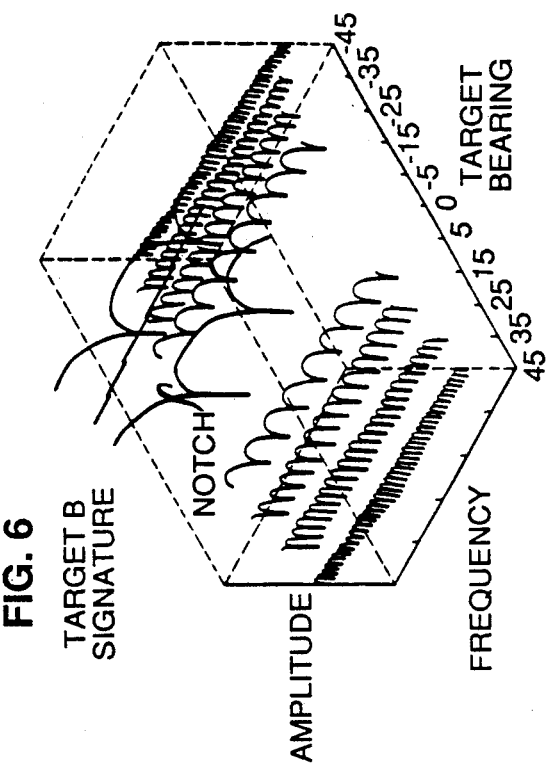
FIG. 6 TARGET B SIGNATURE
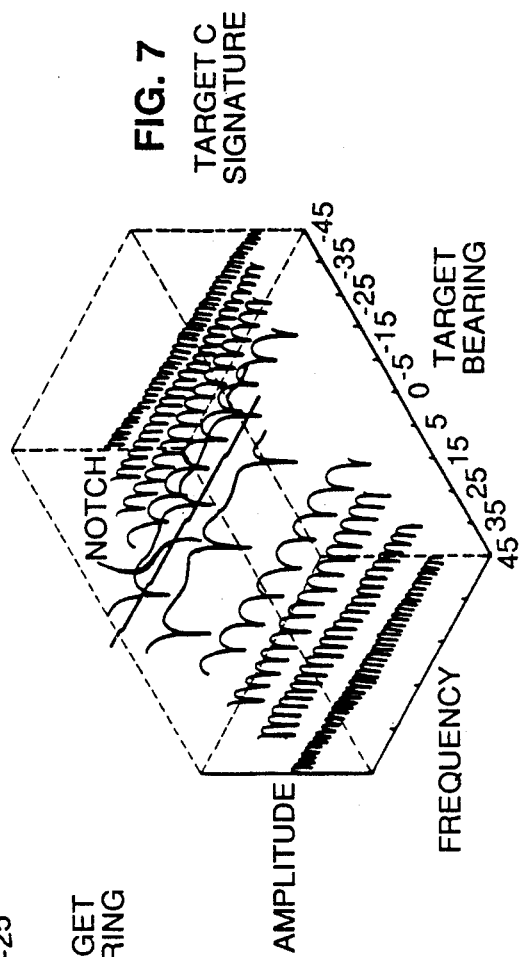
FIG. 7 TARGET C SIGNATURE
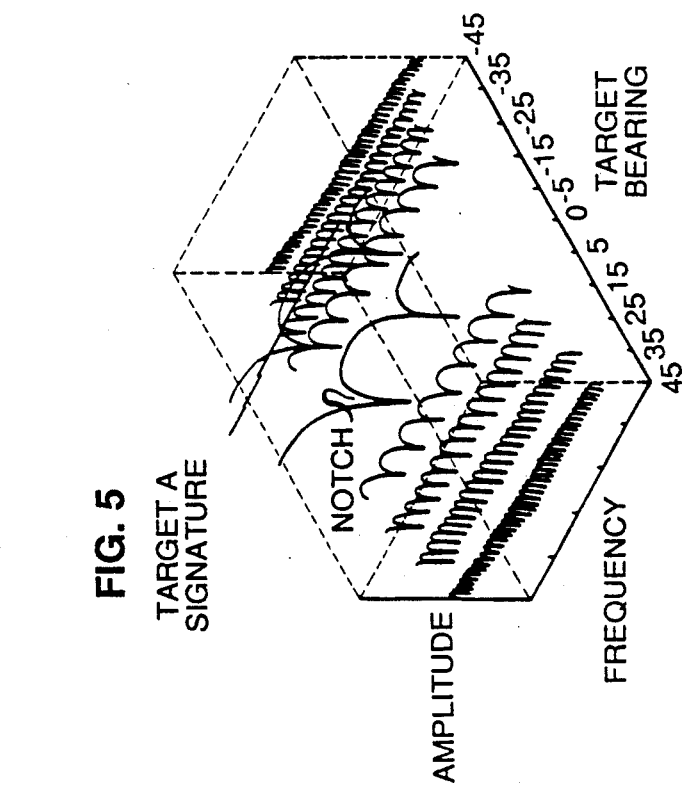
FIG. 5 TARGET A SIGNATURE

15 DEGREE CABLE SIGNATURE

10 DEGREE CABLE SIGNATURE

5 DEGREE CABLE SIGNATURE

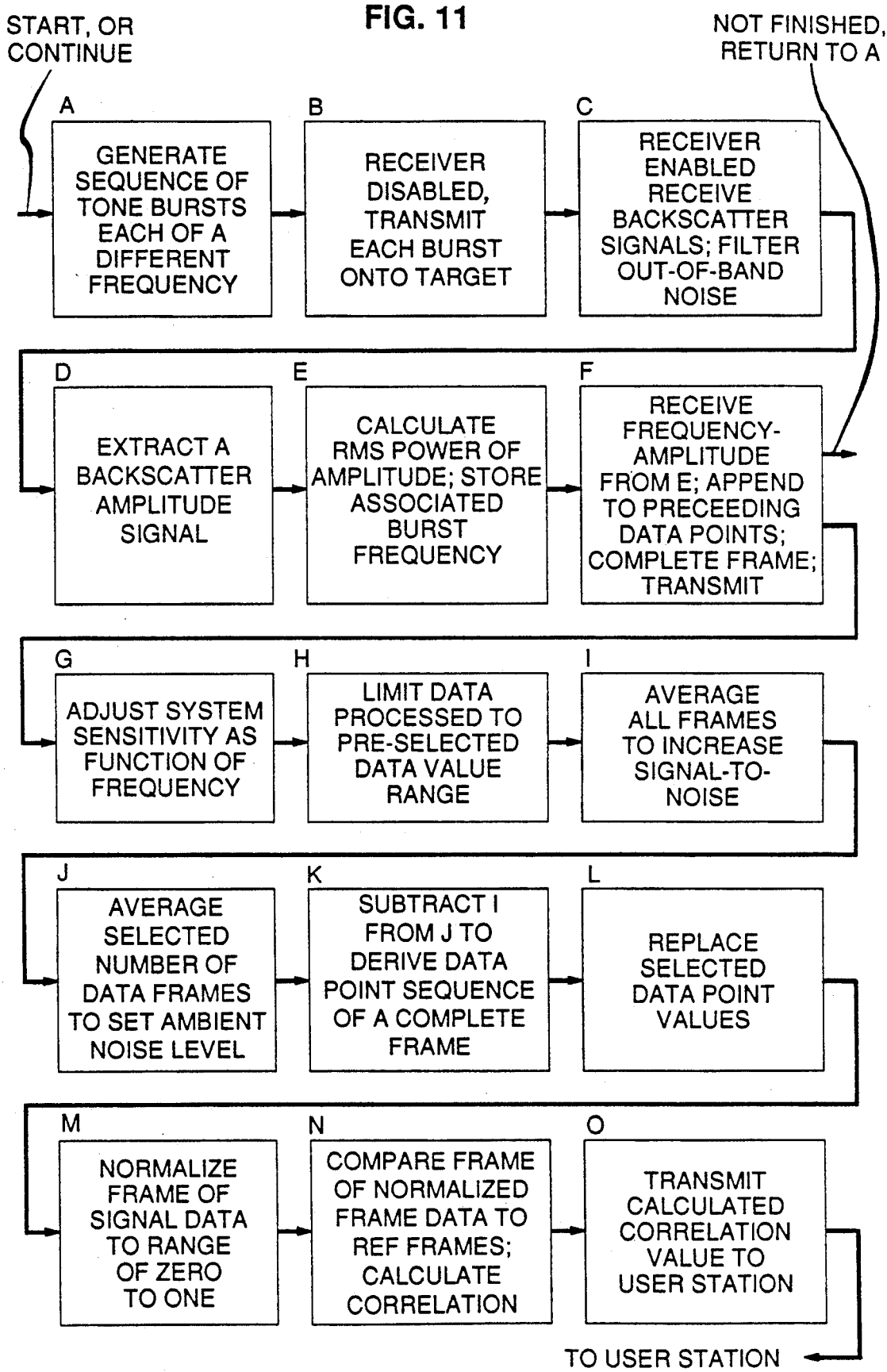

RECEIVER-TRANSMITTER BEAMS

ENHANCED BOTTOM SONAR SYSTEM

This invention relates to locating objects contained in a medium such as an ocean bed or on the ocean floor. More particularly, the invention relates to locating passive objects, such as telephone communications cable buried at a depth of several feet in the ocean floor.

BACKGROUND OF THE INVENTION

The repair or replacement of in-service ocean telecommunications cable is extremely expensive, due in part to the cost of locating the cable in or on the ocean floor. Locating is made more difficult where the cable has been plowed into the ocean bed in areas of trawling, etc. In these situations, the cable-recovery vehicle must have a means to detect the buried cable's specific position before commencing the digging, acquisition and repair procedures.

Although location records usually exist by which the recovery vehicle can proceed to the approximate position of the buried cable, the final pinpointing is a very time-consuming and expensive operation heretofore involving much guesswork. One buried cable detection scheme of the prior art relies on a roving vehicle detecting the magnetic field generated when the cable is energized by a low frequency signal originating from the shore station. This method is restricted in its application, however, due to certain inherent limitations in signal application and recovery which make detection by this method uncertain and, in the case of certain cable systems, not possible.

OBJECTS OF THE INVENTION

A general object of the invention is to locate expeditiously objects buried in the ocean bottom, lying on the ocean floor, or disposed in a column of ocean water.

Another object of the invention is to provide an object-locating system for the ocean environment which utilizes unique indicia of the character of an object based on a model or prototype "signature" of that object's fundamental shape or construction.

A specific object of the invention is to make the process of correct identification of objects buried in the ocean floor more reliable, and thus reduce the cost of recovery.

SUMMARY OF THE INVENTION

This invention is based in part on the realization that many types of objects located on or in the ocean floor, exhibit or at least approximate the shape of a basic geometric structure such as a cylinder, a sphere, or a rectilinear box. These elemental objects have been found to emit distinct characteristic "signature" backscatter signals when a suitable sonar signal is played onto them. By predetermining the essential characteristic backscatter signals unique to each such elemental object when so insonified, and then comparing these reference backscatter signals to the backscatter signals from an unknonw object, the identity of the sought-after object can be recognized with good success. Likewise, the identity of encountered objects, which are not the sought-after object, can be better established.

Pursuant to the invention, a unique sonar signal is launched in a forward direction from a submarine Remotely Operated Vehicle ("ROV") onto the ocean floor. The beam is predetermined in beamwidth, attack angle, cross-section, and signal character. The signal consists of a succession of bursts of different frequencies separated by silent periods. The ROV travels in a predetermined direction across the area to searched, with the search signal repeatedly launched. Each burst sequence generates a resulting set of backscatter patterns, both from unknown objects and from the ocean floor medium.

The backscatter signals generated by contact of the beam energy with an unknown object, contain components which, pursuant to the invention, are a function broadly of: frequency and duration of the incident sonar signal; the signal's grazing angle; the internal construction of the cable; the diameter of the cable; and the length of cable which is insonified. The backscatter signals also are modulated in their return path by a complex interaction with the launched signal.

The backscatter signals are received by the sonar apparatus for analysis. By comparing the backscatter signal patterns to a data library of known signal patterns predetermined to be characteristic of backscatter under the same circumstances from various particular elemental objects, the elemental geometry of the backscatter source or sources may be deduced by correlation techniques for determining the "winning" pattern, i.e., the highest level of correlation for a particular library pattern.

The reference library advantageously includes pattern information representing the characteristic "signature" signal from a particular insonified shape, such as a cable of a specific geometry, as a function of rake angle and buried depth. If, for example, the sought-after object is a cable of a known diameter and interior structure, the insonification creates a specular reflection attributable to the cable's cylindrical shape and length and to resonances caused by interior and surface waves reflecting from and circumnavigating the cable. This backscatter energy gives the cable an acoustic "signature" distinct for the cable in question.

Thus, the invention broadly contemplates extracting the distinguishing character of reflected waves from unknown objects, by analysis of their signal patterns against known and predetermined reference signals derived from backscatter signal patterns generated using known buried objects insonified at known grazing angles by the preferred search signal. In practice, the identified components of the backscatter signal may be correlated digitally to known signature patterns; or viewed by an operator as a graphical display with or without visual comparison to known signature patterns. When the backscatter "signature" signal compares favorably to the known signature signal of a particular insonified shape, a probability is established that the source of the backscatter signal is a species of that known shape.

The invention and its further objects, features, and advantages are elucidated in the description to follow of an illustrative embodiment.

IN THE DRAWING

FIGS. 5-7 show three plots of cable signatures for different exemplary cable structures;

FIG. 11 is a flow chart of the process for generating the sonar insonification signal and extracting the useful information from the backscatter signals;

DETAILED DESCRIPTION OF AN ILLUSTRATIVE EMBODIMENT

Figure 1:
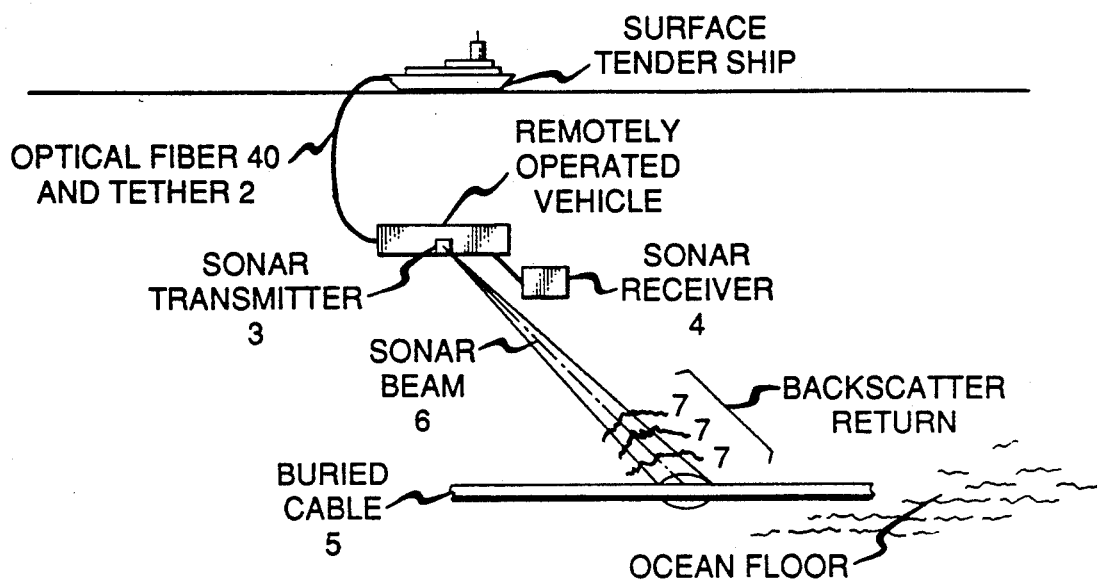
FIG. 1 is a schematic view of an ocean operating environment.

The invention will be described in relation to the detection of an optical fiber telecommunications cable buried in sedimentary ocean bottom, as generally depicted in FIG. 1. A self-propelled remotely operated vehicle, or ROV denoted 1 is connected to a surface ship through control and communications tether 2. Vehicle 1 includes a sonar transducer 3 and a sonar receiver 4. In this example, the cable to be located, denoted 5, is assumed not to be powered, or to have any type of communications or electromagnetic signal induced into it. This is the type of cable which conventional buried cable-locating methods are not well-adapted to handle.

CHARACTER OF THE SONAR SEARCH SIGNAL

As noted, a main premise underlying the present invention is that all objects have a characteristic acoustic signature when insoified by energy of a particular character. The sonar beam 6 emitted from transducer 3 advantageously is a narrow-width beam, less than 6 degrees typically. The sonar signal may be formed with an array of piston-anvil transducer heads (not shown) which are known in the art. A transmitter array suitable for practicing the invention may contain, for example, fifteen heads arrayed in a single mount as shown schematically in FIG. 13; or, alternatively, up to twenty-five such heads.

Pursuant to one aspect of the invention, the search signal is generated as a series of frames, each consisting of a succession of separate signal bursts, beginning at a predetermined frequency of, for example, 6000 Hz., with each burst differing from the preceding by some fixed amount, for example, a stepped difference of 5 or 10 Hz. Typically, the "on" duration of each burst is 5 milliseconds; and the time separation between bursts is 50 milliseconds. Successive frames are generated and transmitted toward the vicinity of the sought-after cable 5. The search signal frames generally are formed in a range of from 5,000 Hz, to 20,000 Hz. The exact frequency boundaries for a given condition will vary depending on the target cable parameters.

The invention as noted relies on detecting the identity information of the unknown object contained in the backscatter energy, depicted as returning waves 7 in FIG. 1 reflecting off the unknown target. That backscatter energy can be degraded by reflected signals which, because of an unduly wide beamwidth, generate energy that is out-of-phase in relation to the energy components first impinging on the target. Beam energy therefore should be limited to that impacting the target and ocean floor which is within the first Fresnel Zone (includes all in- phase energy plus the first-time out-of-phase energy). This is achieved by maintaining the beamwidth of beam 6 at a spherical angle which at a burst frequency of 5 KHz. does not exceed approximately 14 degrees, and which at 20 KHz does not exceed approximately 7 degrees. Many sonar transmitter transducers produce beamwidths which vary in the noted fashion as a function of frequency. It is desirable to select a transducer structure that produces a beamwidth below the noted values at these end frequencies and also at the intermediate frequencies.

The conventional art offers at least two structures of sonar transducer suitable for the present invention. One is a parametric head, which generates an extremely narrow beam of, for example, one and one-half degrees; and exhibits no sidelobes. Its drawback is that the electrical-mechanical conversion of energy is extremely inefficient. The piston-anvil sonar head produces sidelobes which can give a false return signal, but is relatively efficient and therefore preferred.

Figure 13:
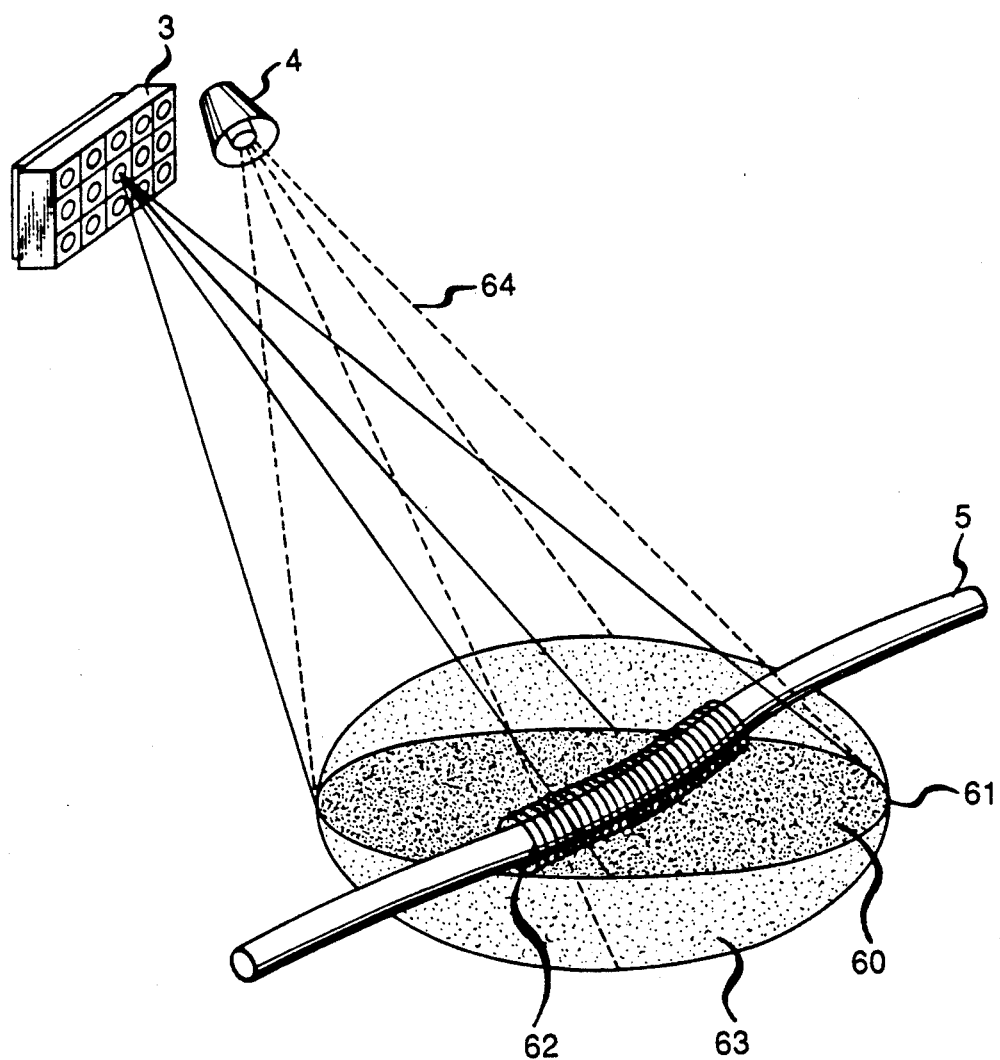
FIG. 13 is an illustration of one form of sonar transmitter array for beamforming and associated receiver.

The cross-section of beam 6 in the plane normal to the direction of propagation can be circular; but, advantageously, may be formed with an elongated elliptical cross-section. The elliptical cross-section is shown in FIG. 13 and will be explained below.

It is preferable for the transmitted beam energy to be directed onto the ocean floor at an attack angle or vertical angle with respect to the ocean floor, such that little or no rebound energy from the floor surface will be returned to the receiver. If, as is usually most convenient, the sonar backscatter receiver is located on the roving vehicle, it follows that a substantial positive attack angle is desirable, in order to ensure that any beam energy which does rebound off of the ocean floor surface, does not remain in the area where the interference patterns between the incoming signal and the signature- containing backscatter signal are developed.

Figure 2:
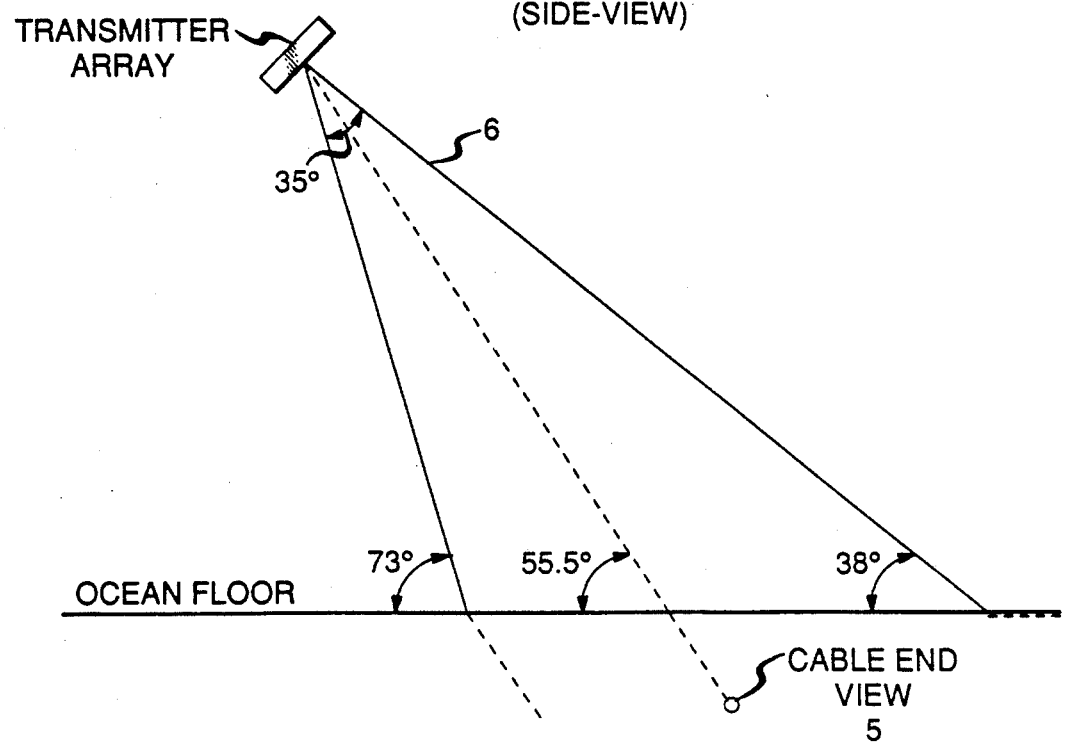
FIG. 2 is a schematic side view of the search sonar beam.

Certain constraints exist, however, in determining the sonar transmitter beam's specific angle of attack. As illustrated in FIG. 2, an attack angle of relatively high magnitude for a given type of floor sediment, such as 73 degrees, may result in rebound energy from the ocean floor being returned to the receiver 4. An attack angle of 38 degrees or less may result in the insonification energy being diverted in a path essentially parallel to the ocean floor, with little energy even reaching the buried cable 5. There exists some optimum angle or angle range, however, at which the search beam's approach angle is not affected either by deflection or diversion; in the example shown in FIG. 2, this angle is about 55 degrees.

REFERENCE SIGNALS

Reference signature patterns are predetermined in accordance with one aspect of the invention, to serve as a basis for positive identification. Reference signatures are derived from actual or reliably simulated field conditions. Reference signatures can be frequency versus amplitude traces at specific approach angles or target bearings such as are shown in FIGS. 5–7. These will be described shortly.

GENERATING BACKSCATTER SIGNALS

It is well-knonw that reflection and scattering energy from a sonar target may be manifested in many modes. These include creeping wave, circumnavigating waves, circumferential wave train, and specular wave train. In practicing the present invention, however, it is only necessary to detect the resonances, such as those depicted in FIGS. 5–7, which are set up by the interference patterns. Thus, it is not necessary to know whether the primary resonance in a given case is attributable to circumnavigating waves or results from direct surface reflections (although in the case of cable resonances these two modes typically predominate). Further, it has been found generally that if the returned information is generated by a search wave having only one frequency, or only one grazing angle, the data frequently is not sufficient to reliably identify an encountered unknown object. However, if frequency and grazing angle are varied, and if data on frequency, grazing angle and signal strength is generated, sufficient information with which to identify the object may be presented.

EXAMPLE 1

Examples of information-bearing backscatter signals which contain the characteristic "signature" of specific cable geometries, are furnished in FIGS. 5-7. The frequencies used in this example range from 7000 Hz. to 10,500 Hz. The amplitude scale is merely relative. The target bearing scale ranges from −45 degrees to +45 degrees; elsewhere in this specification this angle is referred to as the "grazing" angle.

The signature shown in FIG. 5 as Target A, is the acoustic signal for a simple cable (not shown) consisting of a copper inner conductor 0.33 inch in diameter, surrounded by an insulative layer of polyethylene 1.02 inches in OD, an outer conductive layer with a wall thickness of 0.04 inch and a 1.10 inches OD, an outer insulative jacket of polypropylene 1.30 inches in OD, and fifteen steel strength members of 0.02 inch diameter each covered by a rubber coating of 0.32 inch OD disposed around the outer jacket.

The magnitude of the acoustic signature, is a function of both frequency and target bearing between the sonar receiver 4 line of sight and the target cable. The zero degree target bearing for target A has a positive frequency coefficient, i.e., the backscatter for this specific target increases slightly over the range of insonifying frequencies. The plots of the other target bearings are somewhat symmetric with respect to the zero degree target bearing line; and the characteristic "V" notches become more frequent as the absolute value of the target bearing increases. The non-zero target bearing lines have a rounded shape between the notches.

The signature shown in FIG. 6 as Target B is that of a cable structure consisting of an inner copper conductor 0.034 inch in diameter comprising a multiplicity of signal-carrying wires, a layer of polyethylene of 1.0 inch OD, an outer conductor having a 0.02 inch wall thickness, and a plastic insulative outer jacket having a 1.25 inch OD. As noted, the magnitude of the acoustic signature is a function of both frequency and target bearing between the receiver's line of sight and the cable's orientation. Again, the zero degree target bearing has a positive frequency coefficient; and the plots of the other target bearings are symmetric with respect to the zero degree target bearing line. The notches become more frequent as the absolute value of the target bearing increases. However, the non-zero target bearing lines have a rounded shape with somewhat flattened tops between the notches, especially for the five degree lines.

The signature shown in FIG. 7 is that of a more complex cable structure, consisting of an inner copper conductor 0.43 inch in diameter, a plastic insulative layer surrounded by an outer conductor comprising stranded copper wires and totaling 0.95 inch OD, a layer of stranded outer conductor wires of approximately 0.04 OD each, then a layer of 20 steel strength wires each 0.16 in diameter the OD of this layer being 1.30 inches, and finally a fibrous outer jacket, the full OD of the target cable C being 1.50 inches. The non-zero target bearing lines have a squared-off shape between the notches. The five degree bearing lines have an inflection point in their plot. These inflection points are substantially due to internal reflections caused by acoustic impedance mismatches as the sound energy propagates in the cable.

In the preceding example, each full trace is a frame of data points, each generated from the backscatter signal energy of a burst at a known frequency. Each frame thus is made up of a multitude, for example 128, of data points at specific frequencies and target bearing, or graze angles. The result after completing the collection of the 128 sample points, is one of the traces or frames as illustrated in FIGS. 5-7.

EXAMPLE 2

Figure 10:
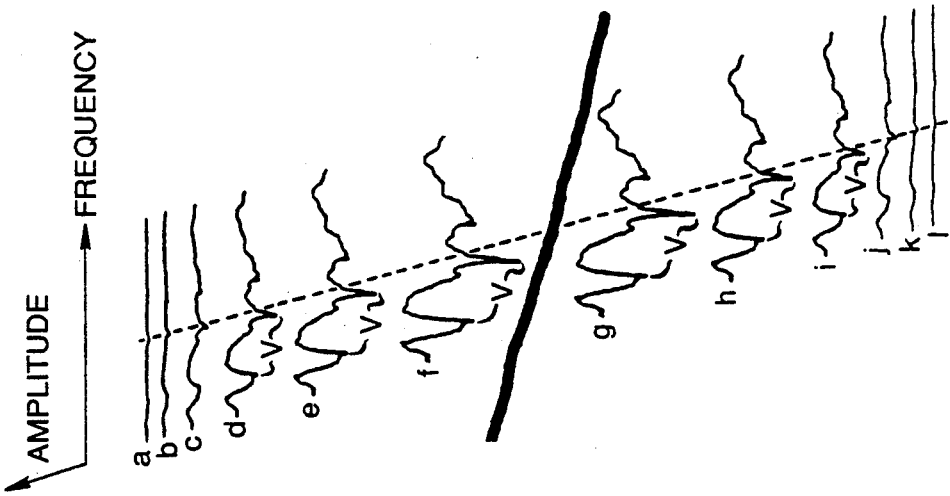
FIGS. 8–10 show three plots of signature data for the same target cable in a schematic illustration of successive frames of data for three backscatter signal sets generated at different graze angles.
Figure 9:
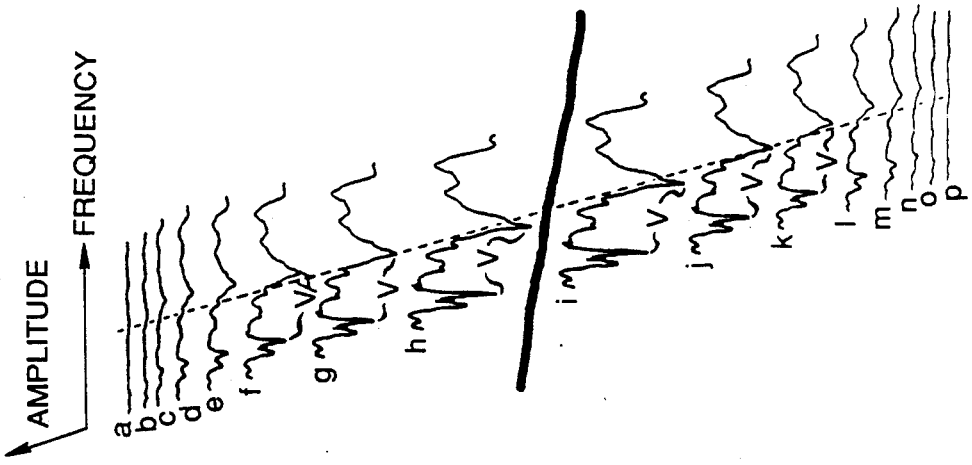
Figure 8:
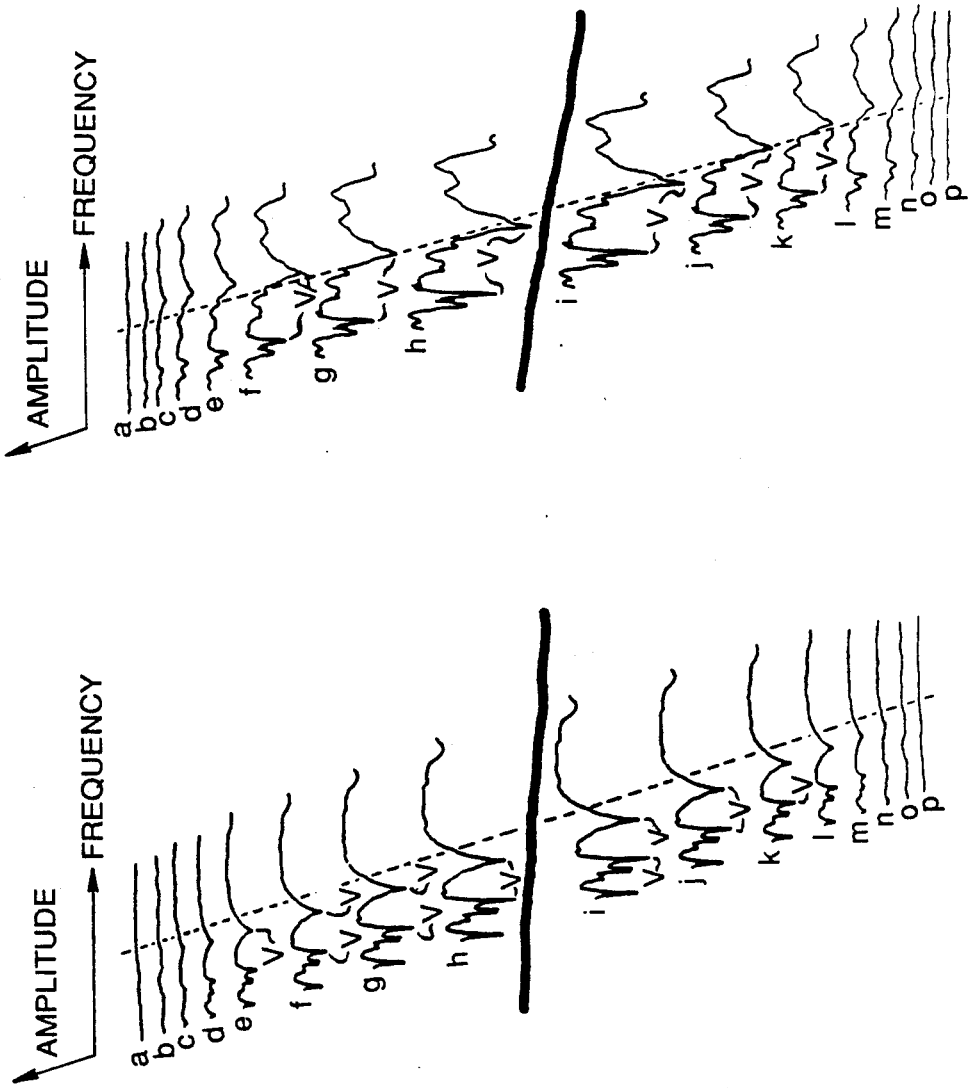

FIGS. 8-10 present a further exposition of the invention, by illustrating the "signature" content of backscatter signals occurring at several different grazing angles as the ROV transits over a cable of a specific geometry. It will be recalled that the backscatter signals are modulations of the launched signal, where the height of the sonar apparatus 3 above the ocean bottom, the buried depth of the unknown object, the relative velocity of the water with respect to the vehicle, the grazing angle, and the dimensions or essential shape and internal construction of the unknown or sought-after object, all contribute to the modulation. The backscatter signal thus is a complex waveform with contributions from creeping waves, circumferential waves of the Rayleigh type, Whispering-Gallery type, and Stoneley-Franz waves, generated during insonification, which create an interference pattern with the oncoming wave. Size and internal cable construction influences the contributions from each wave type in both amplitude and frequency. In Example 2, the search vehicle is traveling approximately 20 feet above the ocean bottom, using a sonar search signal frequency range of from 7 kHz. to 10.5 kHz. Signature results of grazing angles of 5, 10 and 15 degrees are shown in FIGS. 8, 9, and 10.

The ROV 1 puts out a series of frames of chirp search signal format described above. The flatness of the traces denoted a and b indicate that the vehicle is just out of range of the target. The next three traces denoted c, d and e, reveal the beginning of a signature in the form of valleys of amplitude, denoted "V". The traces denoted f, g, h, i, j, k, contain pronounced amplitude valleys, "V", which occur at specific frequencies during the formation of each frame; these traces are taken as the characteristic signature for the particular cable structure of the target insonified under the described conditions.

It will be noted that insonification of the same cable by the same sonar chirp signal at different grazing angles of 10 degrees and 15 degrees, as shown in FIGS. 9 and 10, yields additional cable signature plots of frequency versus amplitude. These additional signatures are similar to those formed with a grazing angle of 5 degrees in FIG. 8, in that, for example, the interior frames f, g, h, i, j, k each exhibit two distinct power valleys denoted "V" which, however, occur at different sweep frequencies and with different overall shapes to the amplitude versus frequency curve.

Identification is by comparing the backscatter signal or signals depicted in FIGS. 8-10 to signatures contained in a signature library consisting of the backscatter signal pattern signatures from any desired number of reference situations for cables of various geometrics insonified under known circumstances, including, of course, the circumstances described with respect to FIGS. 8-10.

The comparison can be made by a trained operator using visual representations of known reference "signature" signals displayed on a monitor against the backscatter signals received during the run. Alternatively or additionally, the comparison can be accomplished by digital signal processing techniques, in a manner to be described.

It is seen from the preceding that, for a given cable size and internal construction, generating a number of data frames with three or four different grazing angles, may be desirable because more backscatter signal patterns are thus created for comparison to the reference signal pattern library. When generating the library reference patterns using known cable configurations, care should be exercised to choose an optimum frequency range, step size, and "on" interval for each frequency burst. In general, it has been realized that the larger the target, the longer the insonifying beam should be "on". Of course, each specific frequency must be maintained "on" long enough to allow the interference pattern to develop. The object is to transmit a given frequency long enough to generate the desired interference pattern between the backscattered signal and the incoming energy, while at the same time if possible generate a creeping wave around the perimeter of the cable. Here, however, there is a tradeoff between the duration of the pulse and the resulting bandwidth of the return signal: in general, this bandwidth should be minimized in order to assure concentration and adequate strength of the interference signal patterns. It may also be desirable to determine the optimum ellipsoidal shape of the beam footprint for a particular size and structure of cable.

The more step increments which are generated in an operational pass, the longer it takes to complete one frame of trace and, accordingly, the slower the search vehicle must travel. On the other hand, with more frames per pass, and more step increments in each frame, the more likely it will be that the analysis of the frames against frames in the reference library will yield a positive identification.

The frequency notches present in the signature trace are the most readily useful indicators of the identity of the buried object. For example, the two "V" notch frame traces shown in FIGS. 8-10 are generally characteristic of signatures emanating from elongate small diameter buried cylindrical objects. A rock, or repeater, or mine, on the other hand, will exhibit a discernibly different characteristic set of signature notches, especially over several different grazing angles. These reference signals, however, may be usefully included in the reference library compiled to locate buried cable, because they provide a way to rule out various uninteresting encountered objects.

EXAMPLE 3

Figure 3:
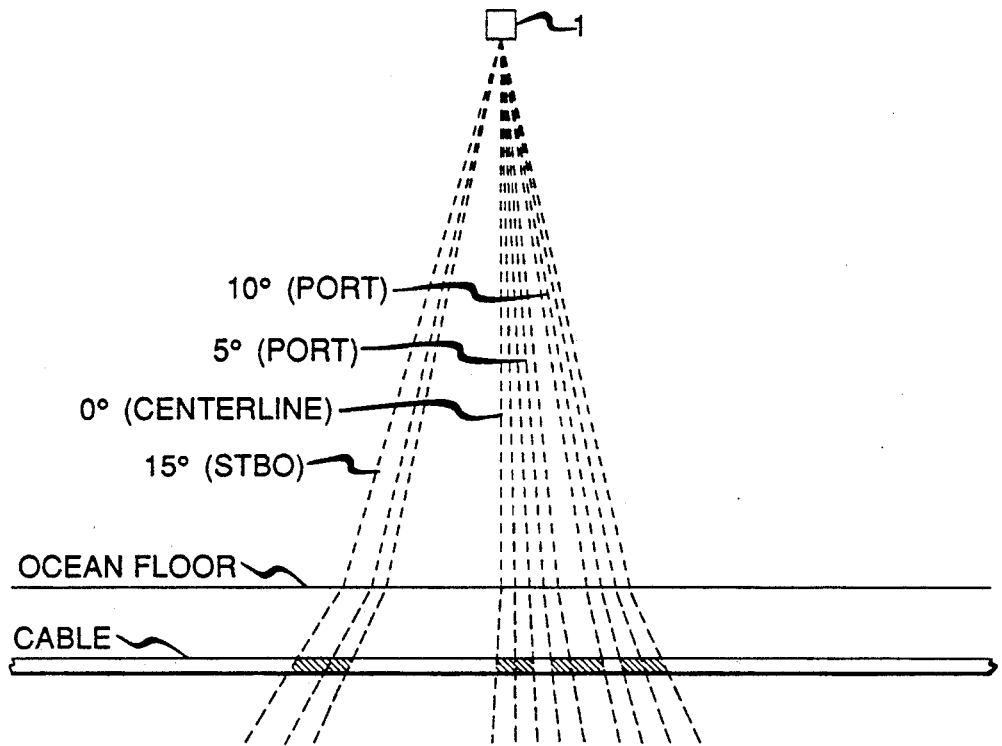
FIG. 3 is a schematic front view of the search beam.
Figure 4:
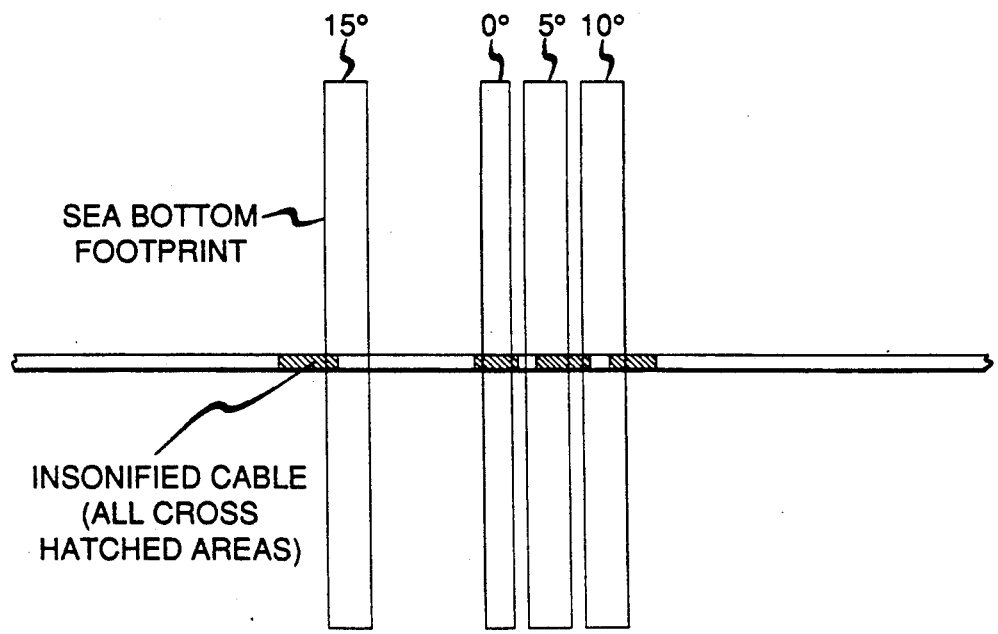
FIG. 4 is a schematic top view of beam traces across a buried cable.

FIGS. 3 and 4 illustrate another approach for playing the search beam onto target areas; and also illustrate that one result of insonifying a buried elongate object at increasing grazing angles is a beam coverage of a longer portion of the object, with both positive and negative results.

FIG. 2 shows the ROV 1 initially located to the side of the buried cable at a stationary point, having acquired a target of an unknown object. The purpose now is to test for presence of a sought-after buried cable. To this end, the ROV is rotated in the horizontal plane while stationary in the vertical and pitch planes, to play the search beam 6 onto the target to generate a series of frames of multiple frequency bursts as described, over a "footprint" of ocean floor intersecting the cable, shown in FIG. 4, for each of several predetermined graze angles developed by vehicle rotation. For example, the four grazing angles shown in FIG. 3 as 15 degrees starboard, 0 degrees centerline, 5 degrees port, and 10 degrees port, yield useful information which will be correlated with the system library.

At the 15 degree grazing angle, a deflection of the beam occurs; and, as seen in FIG. 4, a relatively long section of cable is insonified. However, the grazing angle may not be so great that out-of-phase energy is unduly produced. This beam generates a signature characteristic for 15 degrees. Similarly, three further cable signatures are generated, one for each of the remaining grazing angles. The beam oriented at 0 degrees centerline, it will be noted, insonifies the least length of cable; and therefore occasions a relatively lesser amount of out-of-phase components.

The cable signatures generated by the procedure of Example 3, are similar in information content to the signatures depicted in FIGS. 5-7, for example; and the information may be analyzed in substantially the same fashion as described with respect to Example 2 above.

It was earlier noted that an elliptically configured search beam cross-section may be desirable. The reasons are now presented. Referring to FIGS. 8, 9, 10 and 13, as the search beam slowly approaches the cable, a beam with an ellipsoidal footprint sweeps the far end of its major axis across the cable zone and thereby generates the first insonification contact with the target. In this process, the ellipsoidal beam footprint first imparts a relatively minor insonification energy, which insonifies only a small fraction of the first Fresnel zone. As the beam footprint further transits the cable, at a constant angle relative to the ocean floor, more and more of the first Fresnel zone is insonified. The insonification and the resulting backscatter energy increase as the ellipsoidal minor axis approaches the cable. The darkened area of the cable, seen in FIG. 13, represents the maximum insonifying area of the ellipse onto a maximum of cable length. Here, the signature information due to the interference patterns generated, is most pronounced when the insonification is limited to the first Fresnel zone. More information on Fresnel zones in acoustics may be obtained from "Acoustical Oceanography Principles and Applications" by C. S. Clay and H. Medwin, 1977; which to the extent relevant, is incorporated by reference.

VIEWING OR PROCESSING SIGNATURE SIGNALS

The reference signature information can be visually presented on a monitor, in juxtaposition to the backscatter signal from the unknown or unconfirmed source. Alternatively, the characteristics of the unknown signal pattern can be analyzed by calculating in a digital signal processor the best match between the parameters of the unknown signal against multiple known individual reference signals contained in a data library. The signal processing and system architecture which enables this correlation to be calculated, is described later.

SIGNAL PROCESSING

Figure 12:
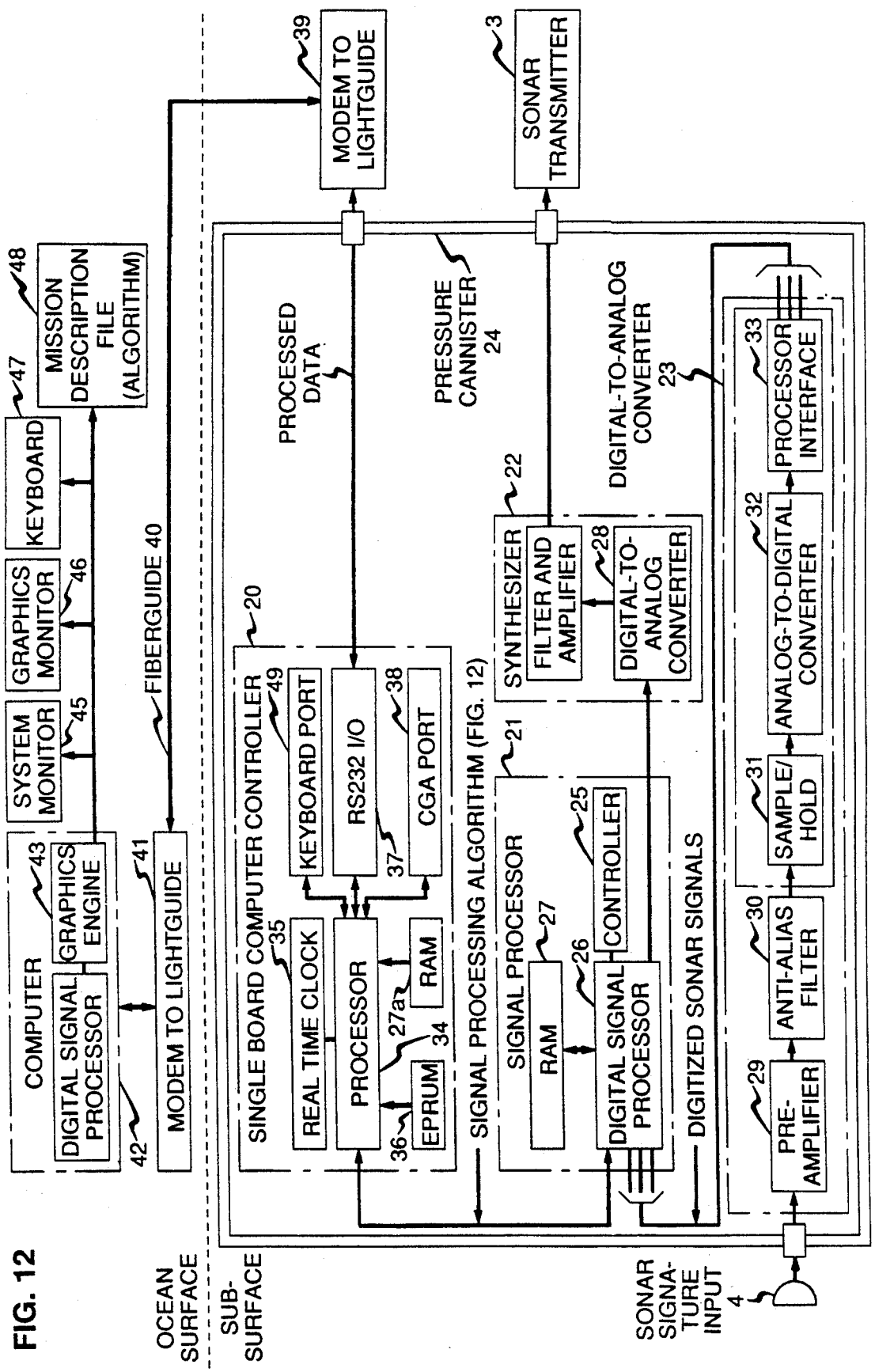
FIG. 12 is a schematic block diagram of a hardware system architecture for practicing the invention.

FIG. 12 is a flow chart presenting the sequence of basic signal generating and processing steps used in practicing the invention. The several steps are described as being performed in Blocks of the flow chart. The general hardware used to perform the steps is described thereafter; occasional reference to the hardware elements will also be made in defining the steps of the flow chart.

In the functional descriptions to follow, Steps A through F perform single data point processing. Steps G through O perform data frame processing after data on a complete data frame is acquired by repeated execution of Steps A-F. Each data point contains a large multiplicity of data samples, for example, 584. Each of the 584 samples are multiplied by each coefficient, for example 128, of the filtering step C below, and then summed to generate one data point. The buffers hereinafter referred to are simply conventional locations in the memory of processor 26, or in RAM 27 associated with processor 26. All data processing described below in Steps A-F utilizes these memories. A data word is stored in a buffer (RAM) until the data words are accessed by the processor at the appropriate time as determined by the algorithm, then arithmetically manipulated and stored back in memory for use by the next stage of the algorithm.

Step A—This function generates a sequence of tone bursts, each burst being separated in time from, and at a different frequency than, its predecessor until a predetermined number of steps, for example 128 steps, have been generated. Then, the sequence is repeated, under the control of Step F. Provision is made for setting the sampling rate for digital to analog converter 28, shown in FIG. 12, and for analog to digital converter 32 of receiver 23. The values used must be above the Nyquist rate for the signals to be analyzed and for the signals to be generated. In general, the sampling rate is set at five times the highest frequency to be analyzed. Step A also sets the peak amplitude of the analog output voltage of a digital to analog converter 28 for driving transmitter 3. The step frequency and the number of steps is also set.

Step B—This function controls the output pulse length of transmitter 3, the length of a receiver input buffer, and the receiver 4 time delay. The function is useful to prevent receiver 4 from being overloaded during the transmit pulse, and to reduce the received ambient noise. Whenever the transmitter is turned "on" to generate an output pulse, the receiver input is gated "off". The length of time that the receiver 4 is gated "on" is controllable in that the operator may not know precisely when the backscatter energy from the target will return to the receiver; and therefore initially will set receiver 4 "on" or a relatively long period of time. Once the travel time to the target and back is determined, the operator can readjust the receiver to gate out only the desired target return and reduce the amount of noise received into signal processor 21.

Step C—This function is a digital filter comprising a finite impulse response bandpass filter 30 to remove out-of-band noise. Advantageously, a substantially linear phase response is achieved, to reconstruct backscatter signals from the target cable, without phase distortion. In order to provide a narrow transition band and a sidelobe level greater than 90 dB below the passband, 127 filter sections are employed. The total transition band should be less than 3000 Hz. The filter step is implemented with ony zeros (no poles) in order that it will be inherently stable, a necessary requirement for a system processing pulsed energy.

Step D—This function takes as its input the output data from Step C, and provides for the operator a capability to more fully extract the desired signal from the background noise. The function transfers a section of data as defined by the operator from an input buffer to an output buffer (neither shown)) in sample/hold function 31. As the input data are representative of filtered samples of the received target data in the time domain, this function represents a time domain gate.

Step E—This function calculates the RMS power of the data collected in Step D. The output of the function is a single data point, which is supplied to Step F. This data point is a result of the transmitter having generated one pulse of energy into the repeater at a single set frequency.

Step F—This function takes the operator-specified number of input data points and appends them onto the preceding data points in an output data frame buffer in processor 26. It then checks to see if the number of appended data points is equal to the number requested by the operator; and if it is not, Step F causes Step A to step to the next frequency in its sequence and to generate an output. This process of generating a pulse and receiving, filtering, cutting and computing the RMS value of the return signal, is then repeated until Step F appends the required number of data points into an output data frame buffer. Once the output buffer is full, the data are passed to the next functional step and the algorithm is reset to begin generating the next set of pulses.

Step G—The function of this Step is to correct the overall response of the system for terminal sensitivity parameters of the receiver 4 and transmitter 3 as a function of frequency. For a given level of input drive, the transmitter 3 will generate an output level that varies with frequency. A similar variation of input signal level with frequency is found for receiver 3. Step G corrects for these variations, by multiplying the data in an input buffer (not shown) by a window data sequence which is read from a data file located in system memory 27.

Step H—This function constrains the data being processed by the system to remain within a given range of data values, to eliminate the chance of computational overflow in the algorithm.

Step I—This function increases the signal-to-noise ratio of the system, by averaging data frames.

Step J—This function averages an operator-specified number of data frames on a point-by-point basis and then holds indefinitely the average of these frames in an output buffer. This frame of averaged frames is considered to be the background or ambient noise of the system; and is subtracted from later input signals. That is, if a target is insonified, the receiver will receive ambient noise plus the information-containing signal; and these stored noise values can be subtracted from that input in order to leave only the desired signal for final processing.

Step K—This function performs a conventional point-by-point subtraction of real buffers. The input data attached to a secondary input is subtracted from the input data connected to the primary line. The buffers must match in both size and type, or an error message will be generated. This function is included to subtract from the signal plus noise output of Step I, the noise output from Step J, and will help assure that only the desired signal is presented for final processing.

Step L—This function provides the input data to an output buffer while replacing values which are greater than or equal to the lower or less than or equal to the upper limit by the value specified by the operator and stored in system memory in RAM 27.

Step M—This function normalizes the target data to the range of zero to one. In this manner, all signal information is presented to the next step in the algorithm, a conventional P-match function, within a standard range of data values.

Step N—This function correlates the input data buffer in processor 26 with a specified number of Library Data Patterns, and places the resulting correlation values into an output buffer.

Step O—This function enables the transfer of processed data from the processor 26 to the surface computer 42 via the ROV data subsystem including modem-to-lightguide unit 37 and fiberguide 40. The step automatically adjusts its data buffers to the size of the data word coming from the functional step to which it is connected - here, the P-match function.

SIGNAL PROCESSING ARCHITECTURE

FIG. 12 illustrates in block diagram form a high-level view of hardware which generates the search signals and runs the processing steps in accordance with the invention. Basically, the hardware contained in the ROV 1 consists of a controller 20, a signal processor 21, a synthesizer 22, and an analog-to-digital converter 23. These components are contained in a watertight canister 24. Connections to a surface Host computer 42 are afforded on a fiberguide 40.

Signal processor 21 consists for example of an AT&T WE DSP32 digital signal processor 26. A 64K external conventional RAM memory 27 is provided. Processor 26 is available from the American Telephone and Telegraph Company. It has an architecture comprising a 32-bit floating point DAU and a 16-bit fixed point CAU. Processor 26 processes over 6 million instructions per second. All instructions execute in a single clock cycle. Processor 26 in part carries out the functions of Block A in FIG. 12, by generating a sequence of tone bursts of different frequencies separated in time, and processing the backscatter returns in real time. Processor 26 sets the sampling rate for digital to analog converter 28 associated with the transmitter 3 driven by synthesizer 22. Prosessor 26 also sets the sampling rate for A/D converter 23 which receives and preprocesses the sonar signature inputs from receiver 4. Processor 26 also sets the step frequency and the number of steps; and also controls the output pulse length of transmitter 3, the length of a receiver input buffer (not shown) contained in synthesizer 22 and the receiver 4 time delay. The signal processor implements steps of the algorithms shown in FIG. 11.

A/D converter 23 includes a conventional preamplifier which boosts the level of the received backscatter signal in order that the signal will extend over the full range of the A/D converter and thereby be converted with optimum accuracy. Converter 23 also includes an anti-clip filter 30 which prevents "aliasing" of the received signal due to the sampling process.

The Sample/hold circuit 31 captures and holds a level of the received signal until the A/D converter has completed its conversion process. A/D converter 32 converts the received analog signal to a 16-bit digital word for processing. DSP interface unit 33 conventionally connects converter 23 to processor 26. Controller 20 contains a processor 34, which can be an 80826 chip Intel chip. A clock 35, an eprom 36 and 1 Meg. of external memory provided by Ram 37, serve processor 34 in conventional fashion. The elements 34-38 form a general purpose computer.

The function of processor 20 is to store the real-time programs to be run by elements 21, 22, and 23; and to schedule the initializing and completion of the various processes. Connections between pocessor 34 and Host computer 42 may be through modems 39, 41 and RS232 port 37 of controller 20. The keyboard port allows a keyboard to be interfaced to the ROV subsystem for manual checkout and proper operations prior to a dive. The CGA port 38 furnishes graphics connectivity to a general purpose monitor to provide diagnostic capability prior to a dive. Host computer 42 advantageously is located topside on the search vessel. Through Host 40 and associated controls, the ROV movement is controlled; and the search routines of the present invention are communicated to the subsurface components. Host 42 includes another digital signal processor 43, which is a copy of the processor in the ROV, and is used for algorithm development and also as a spare when the system is at sea. The operator has access to a system monitor 45, and to a graphics monitor 46 driven by a conventional graphics engine 44.

The signal processing algorithm and reference signal patterns are stored on disc 48 and subsequently downloaded to the memory of controller 20 and processor 21 in the ROV. The algorithm previously described and depicted in FIG. 11 is also downloaded to the memory of processor 21. Controller 20 causes processing elements 21, 22, and 23 to implement the algorithm and up-load the final results via fiberguide 40 to the surface computer 22 for presentation to the operator via a graphics program stored in computer 42 for viewing on monitors 45 and 46.

The hardware and processes described to implement the invention are only illustrative. The components described are available from many sources known to persons skilled in the art. The further details, moreover, of the hardware are familiar to those skilled in the art. The invention is embraced in the scope of the claims to follow.

I claim:

1. A system for identifying objects, comprising:
   means for transmitting toward a target a first signal comprising a succession of bursts of selected different frequencies;
   means for receiving the target backscatter energy created by each successive individual frequency burst of said first signal;
   means for collecting as data points over the range of frequencies used, each backscatter signal amplitude value and the associated burst frequency;
   a reference library of data point sets, each set predetermined to be representative of the backscatter energy of a particular object when impinged by said first signal; and
   means for determining which set of predetermined reference data points is most closely matched to said collected data points.

2. The system of claim 1, further comprising:
means for transmitting a succession of said first signals.

3. The system of claim 2, further comprising:
means for transmitting each successive burst of each first signal for a long enough duration to intercept and interfere with said backscatter signals from the same burst.

4. The system of claim 3, wherein said transmitting means comprises means for separating individual bursts with a silent period.

5. A system for identifying objects disposed on or within the floor of a body of water, comprising:
means for transmitting toward a target a first sonar signal comprising a succession of bursts of selected different frequencies;
means for receiving the target backscatter energy created by each successive individual frequency burst of said first sonar signal;
means for collecting as data points over the range of frequencies used, each backscatter signal amplitude value and the associated burst frequency;
a reference library of data point sets, each set predetermined to be representative of the backscatter energy of a particular object on or within said floor when impinged by said first signal; and
means for determining which set of predetermined reference data points is most closely matched to said collected data points.

6. The system of claim 5, further comprising:
means for transmitting a succession of said first sonar signals.

7. The system of claim 6, further comprising:
means for transmitting each successive burst of each said first sonar signal for a long enough duration to intercept and interfere with said backscatter signals from the same burst.

8. The system of claim 7, wherein said transmitting means comprises means for separating individual bursts with a silent period.

9. A system for identifying a cable disposed on or within the floor of a body of water, comprising:
means for transmitting toward said cable a first sonar signal comprising a succession of bursts of selected different frequencies;
means for receiving the target backscatter energy from said cable created by each successive individual frequency burst of said first sonar signal;
means for collecting as data points over the range of frequencies used, each backscatter signal amplitude value and the associated burst frequency;
a reference library of data point sets, each set predetermined to be representative of the backscatter energy of a particular structure of cable on or within said floor when impinged by said first signal; and
means for determining which set of predetermined reference data points is most closely matched to said collected data points.

10. The system of claim 9, further comprising:
means for transmitting a succession of said first sonar signals onto said cable.

11. The system of claim 10, further comprising:
means for transmitting each successive burst of each said first sonar signal for a long enough duration to intercept and interfere with said backscatter signals from the same burst.

12. The system of claim 11, wherein said transmitting means comprises means for separating individual bursts with a silent period.

13. The system of claim 12, wherein said library comprises data point sets representative of rhe backscatter energy of a particular structure of cable on or within said floor when impinged by said first signal at predetermined grazing angles.

14. The system of claim 13, wherein said transmitting means further comprises means for controlling the beamwidth and the beam cross-section of said first sonar signal.

15. The system of claim 14, wherein said transmitting means further comprises means for controlling the attack angle of said first sonar signal with respect to said floor.

16. The system of claim 15, wherein said library further comprises data point sets representative of the backscatter energy of a particular structure of cable on or within said floor when impinged by said first sonar signal at predetermined attack angles.

17. The system of claim 16, wherein said succession of separate signal bursts are contained in a range of substantially from 5,000 Hz. to 20,000 Hz.

18. The system of claim 17, wherein said succession of frequency bursts in each said first signal are separated by a predetermined selected positive step function.

19. The system of claim 18, wherein the duration of each burst is substantially 5 milliseconds; and the time separation between bursts is substantially 50 milliseconds.

20. The system of claim 19, wherein the cross-section of said search signal is an ellipsoid with the major axis thereof oriented to sweep across said cable.

21. The system of claim 20, further comprising;
means for visually presenting said collected data points on a monitor.

22. The system of claim 21, further comprising:
means including a digital signal processor for comparing said collected data points with said representative data point sets.

23. A method for identifying a cable disposed on or within the floor of a body of water, comprising:
transmitting toward said cable a first sonar signal comprising a succession of bursts of selected different frequencies;
receiving the target backscatter energy from said cable created by each successive individual frequency burst of said first sonar signal;
collecting as data points over the range of frequencies used, each backscatter signal amplitude value and the associated burst frequency;
providing a reference library of data point sets, each set predetermined to be representative of the backscatter energy of a particular structure of cable on or within said floor when impinged by said first signal; and
determining which set of predetermined reference data points is most closely matched to said collected data points.

24. The method in accordance with claim 23, wherein said transmission step further comprises:
generating a sequence of tone bursts in which each burst is an incremental step higher in frequency than the preceding burst, and each burst is separated in time from its predecessor, for a predetermined number of steps, and then repeating the sequence.

25. The method in accordance with claim 24, comprising the further step of setting the sampling rate to a predetermined value depending on the highest frequency transmitted.

26. The method of claim 25, comprising the further step of disabling said receiving step during said transmitting step.

* * * * *